(12) United States Patent
Noh

(10) Patent No.: US 12,502,968 B2
(45) Date of Patent: Dec. 23, 2025

(54) METHOD AND SYSTEM FOR SAFELY OPERATING AND CONTROLLING ELECTRIC MOTOR IN ELECTRIC MOBILITY

(71) Applicant: K-WON ELECTRONICS CO., LTD., Cheonan-si (KR)

(72) Inventor: Hyeong Tae Noh, Gyeonggi-do (KR)

(73) Assignee: K-WON ELECTRONICS CO., LTD., Cheonan-si (KR)

( * ) Notice: Subject to any disclaimer, the term of this patent is extended or adjusted under 35 U.S.C. 154(b) by 50 days.

(21) Appl. No.: 18/290,982

(22) PCT Filed: Jul. 13, 2022

(86) PCT No.: PCT/KR2022/010174
§ 371 (c)(1),
(2) Date: Jan. 22, 2024

(87) PCT Pub. No.: WO2023/003253
PCT Pub. Date: Jan. 26, 2023

(65) Prior Publication Data
US 2024/0343119 A1 Oct. 17, 2024

(30) Foreign Application Priority Data
Jul. 22, 2021 (KR) .......................... 10-2021-0096460

(51) Int. Cl.
*B60L 3/00* (2019.01)
*B60L 15/20* (2006.01)
(Continued)

(52) U.S. Cl.
CPC ............. *B60L 3/0061* (2013.01); *B60L 15/20* (2013.01); *B60L 58/12* (2019.02); *B60L 58/18* (2019.02); *B60L 2250/26* (2013.01)

(58) Field of Classification Search
CPC ........ B60L 3/0061; B60L 15/20; B60L 58/12; B60L 58/18; B60L 2250/26;
(Continued)

(56) References Cited

U.S. PATENT DOCUMENTS 8,751,087 B1 * 6/2014 Dufford ................ B60W 10/06
180/65.23

FOREIGN PATENT DOCUMENTS

JP 2005-271613 A 10/2005
KR 10-2019-0013021 A 2/2019
(Continued)

OTHER PUBLICATIONS

International Search Report issued Nov. 9, 2022 in corresponding PCT Application No. PCT/KR2022/010174.

*Primary Examiner* — Alan D Hutchinson
(74) *Attorney, Agent, or Firm* — Fox Rothschild LLP

(57) ABSTRACT

Provided is a method for safely operating and controlling an electric motor in an electric mobility. The method comprises the steps of: obtaining first battery power information provided by a BMS while a vehicle is traveling; measuring second battery power information according to a motor torque depending on the driver's pedal opening degree in each driving situation; comparing the first and the second battery power information with each other; determining whether the motor is abnormal on the basis of the compared result; and performing control to limit motor output step by step when the motor is determined to be abnormal.

12 Claims, 7 Drawing Sheets

(51) Int. Cl.
*B60L 58/12* (2019.01)
*B60L 58/18* (2019.01)

(58) Field of Classification Search
CPC .. B60L 3/0038; B60L 2240/12; B60L 3/0046; B60L 2240/423; B60L 2240/545; B60L 2240/549; B60L 3/00; Y02T 10/70
See application file for complete search history.

(56) References Cited

FOREIGN PATENT DOCUMENTS

| KR | 10-2019-0092037 A | 8/2019 |
| KR | 10-2020-0064224 A | 6/2020 |
| KR | 10-2021-0057895 A | 5/2021 |

* cited by examiner

METHOD AND SYSTEM FOR SAFELY OPERATING AND CONTROLLING ELECTRIC MOTOR IN ELECTRIC MOBILITY

CROSS-REFERENCE TO RELATED APPLICATIONS

This application is a U.S. national phase application, pursuant to 35 U.S.C. § 371, of PCT Application No. PCT/KR2022/010174, filed Jul. 13, 2022, which claims priority from Korean Patent Application No. 10-2021-0096460, filed on Jul. 22, 2021. The entire contents of these applications are incorporated herein by reference in their entirety.

TECHNICAL FIELD

The disclosure relates to a method and system for safely operating and controlling an electric motor in an electric mobility.

BACKGROUND ART

A technology for preventing a sudden engine output attributable to a malfunction of a controller has been applied to the existing internal combustion engine (gasoline or diesel) vehicle. However, the development of a method of limiting the output of a motor, that is, a power source related to an electric mobility (an electric vehicle, an electric two-wheeled vehicle, an electric scooter, etc.) is not sufficient.

If the output of the motor, that is, a power source for the electric mobility, is excessive contrary to a driver's intention, the driver may face a dangerous situation. Accordingly, there is a need for a scheme which induces the driver into a safe state by detecting and properly controlling an abnormal situation.

DISCLOSURE

Technical Problem

An object of the present disclosure is to provide a method and system for safely operating and controlling an electric motor in an electric mobility, which induce a driver into a safe state by monitoring a situation in which the output of a motor is excessive contrary to required torque in a VCU when an MCU controller has an internal failure or an abnormal control state in real time.

However, objects of the present disclosure to be achieved are not limited to the aforementioned objects, and other objects may be present.

Technical Solution

A method of safely operating and controlling an electric motor in an electric mobility according to a first aspect of the present disclosure for achieving the aforementioned object includes calculating first battery power information that is provided by a BMS while a vehicle travels, measuring second battery power information based on motor torque for each degree of opening of a pedal by a driver for each driving situation, comparing the pieces of first and second battery power information, determining whether the motor is abnormal based on a result of the comparison, and performing control for limiting an output of the motor step by step when the motor is determined to be abnormal.

In some embodiments of the present disclosure, the calculating of the first battery power information that is provided by the BMS while the vehicle travels may include calculating the first battery power information based on current and voltage information that is provided by the BMS.

In some embodiments of the present disclosure, the measuring of the second battery power information based on the motor torque for each degree of opening of the pedal by the driver for each driving situation may include calculating the second battery power information for 0 torque control when a state of the degree of opening of the pedal by the driver is an OFF state in a non-regenerative breaking state. The determining of whether the motor is abnormal based on the result of the comparison may include determining that the motor is abnormal when the first battery power information is greater than the second battery power information by a preset critical range.

In some embodiments of the present disclosure, the measuring of the second battery power information based on the motor torque for each degree of opening of the pedal by the driver for each driving situation may include calculating the second battery power information in a regenerative breaking state when a state of the degree of opening of the pedal by the driver is an OFF state. The determining of whether the motor is abnormal based on the result of the comparison may include determining that the motor is abnormal when the second battery power information is less than 0 and the first battery power information is greater than 0.

In some embodiments of the present disclosure, the measuring of the second battery power information based on the motor torque for each degree of opening of the pedal by the driver for each driving situation may include measuring the second battery power information for each driving situation corresponding to at least one of an amount of remaining battery power charged, a degeneration degree, maximum output information, a battery cell temperature, a motor temperature, and a road surface gradient.

Some embodiments of the present disclosure may further include calculating first acceleration information that is measured while the vehicle travels based on at least one of a torque meter, a speed sensor, and an acceleration sensor, measuring second acceleration information based on a variance in the degree of opening of the pedal by the driver for each driving situation and comparing the second acceleration information with the first acceleration information, and determining whether the motor is abnormal based on a result of the comparison.

In some embodiments of the present disclosure, the performing of the control for limiting the output of the motor step by step when the motor is determined to be abnormal may include performing primary control that limits the output of the motor torque through an MCU.

In some embodiments of the present disclosure, the performing of the control for limiting the output of the motor step by step when the motor is determined to be abnormal may include performing secondary control that blocks battery pack power when the motor torque is greater than a preset critical value after performing the primary control.

In some embodiments of the present disclosure, the performing of the control for limiting the output of the motor step by step when the motor is determined to be abnormal may include performing tertiary control that limits a start of the vehicle upon stop of the vehicle after performing the secondary control.

In some embodiments of the present disclosure, the performing of the tertiary control may include adding an error counting number for an abnormal state of the motor, resetting the MCU after the stop of the vehicle, and permitting a restart of the vehicle as the resetting of the MCU is completed.

In some embodiments of the present disclosure, the permitting of the restart of the vehicle as the resetting of the MCU is completed may include limiting required torque for each degree of opening of the pedal by the driver so that the required torque is reduced in accordance with the error counting number as the error counting number is increased.

Furthermore, a system for safely operating and controlling an electric motor in an electric mobility according to a second aspect of the present disclosure includes memory in which a program for determining whether an electric motor is abnormal based on battery power information and limiting the output of the motor corresponding to the determination has been stored and a processor configured to execute the program stored in the memory. The processor calculates first battery power information that is provided by a BMS while a vehicle travels by executing the program, measures second battery power information based on motor torque for each degree of opening of a pedal by a driver for each driving situation, determines whether the motor is abnormal by comparing the pieces of first and second battery power information, and performs control for limiting the output of the motor step by step when the motor torque is determined to be abnormal.

A computer program according to another aspect of the present disclosure for achieving the aforementioned object executes the method of safely operating and controlling an electric motor in an electric mobility in combination with a computer, that is, hardware, and is stored in a computer-readable recording medium.

Other details of the present disclosure are included in the detailed description and the drawings.

Advantageous Effects

According to the aforementioned embodiment of the present disclosure, when the output of a motor is excessively generated in an MCU that controls the motor or the motor in an electric mobility, damage to a battery or the MCU can be minimized and the safety of a driver can be induced through control that limits the output of the motor step by step.

Effects of the present disclosure which may be obtained in the present disclosure are not limited to the aforementioned effects, and other effects not described above may be evidently understood by a person having ordinary knowledge in the art to which the present disclosure pertains from the following description.

MODE FOR INVENTION

Figure 1A:
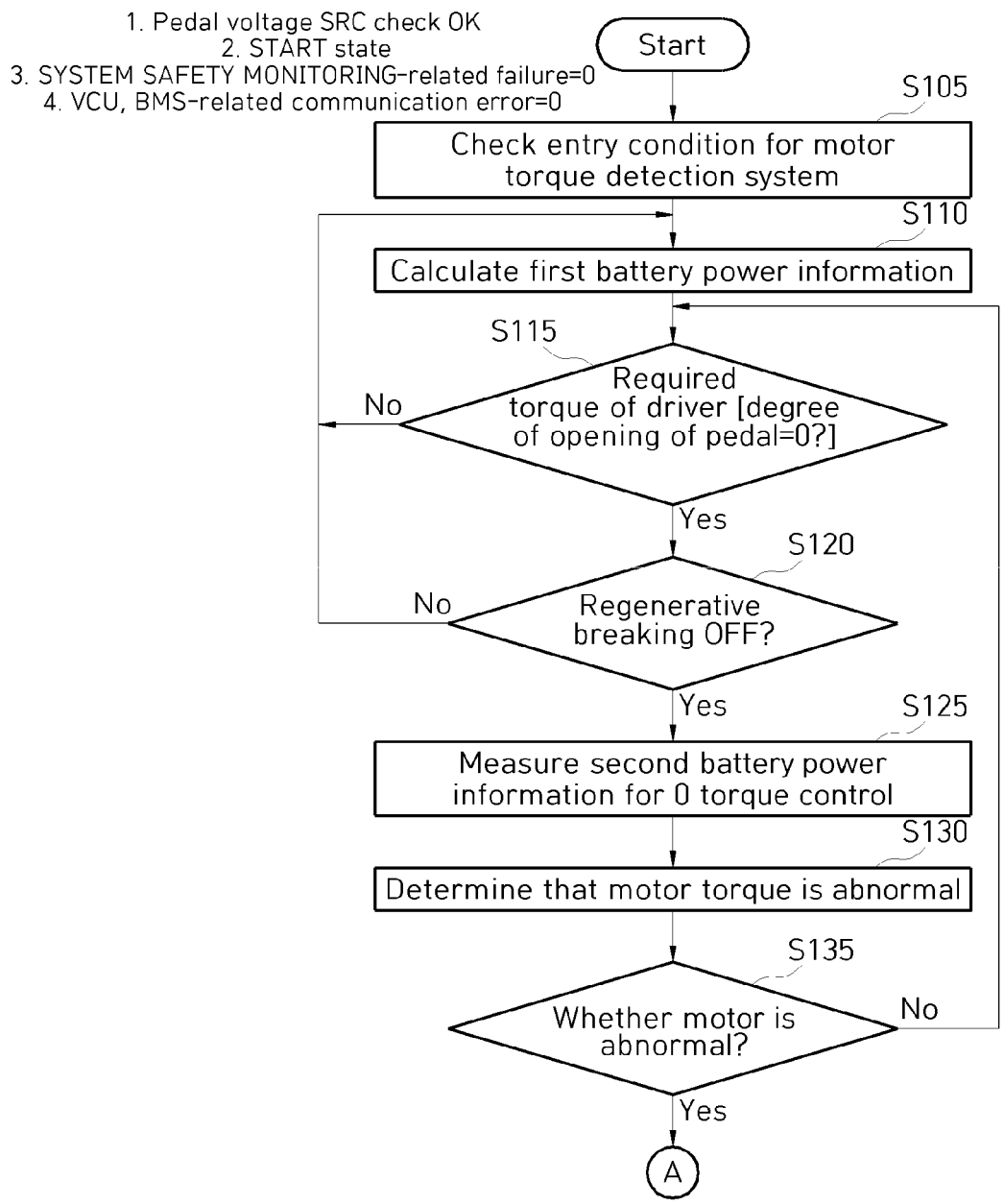
FIGS. 1A and 1B are flowcharts of a method of safely operating and controlling an electric motor according to a first embodiment of the present disclosure.

Advantages and characteristics of the present disclosure and a method for achieving the advantages and characteristics will become apparent from the embodiments described in detail later in conjunction with the accompanying drawings. However, the present disclosure is not limited to embodiments disclosed hereinafter, but may be implemented in various different forms. The embodiments are merely provided to complete the present disclosure and to fully notify a person having ordinary knowledge in the art to which the present disclosure pertains of the category of the present disclosure. The present disclosure is merely defined by the claims.

Terms used in this specification are used to describe embodiments and are not intended to limit the present disclosure. In this specification, an expression of the singular number includes an expression of the plural number unless clearly defined otherwise in the context. The term "comprises" and/or "comprising" used in this specification does not exclude the presence or addition of one or more other components in addition to a mentioned component. Throughout the specification, the same reference numerals denote the same components. "And/or" includes each of mentioned components and all combinations of one or more of mentioned components. Although the terms "first", "second", etc. are used to describe various components, these components are not limited by these terms. These terms are merely used to distinguish between one component and another component. Accordingly, a first component mentioned hereinafter may be a second component within the technical spirit of the present disclosure.

All terms (including technical and scientific terms) used in this specification, unless defined otherwise, will be used as meanings which may be understood in common by a person having ordinary knowledge in the art to which the present disclosure pertains. Furthermore, terms defined in commonly used dictionaries are not construed as being ideal or excessively formal unless specially defined otherwise.

The present disclosure relates to a method and system for safely operating and controlling an electric motor.

In general, an electric mobility consists of a battery, a motor, an inverter, and controllers (a vehicle control unit (VCU), a motor control unit (MCU), and a battery management system (BMS)). Such an electric mobility receives a user's output intention through a sensor or a degree of opening of a pedal, and transmits a desired output value to the MCU by using a method, such as torque or current control, through the VCU. The MCU drives the motor by using a current, a voltage, etc. that are provided by the battery.

In this case, an embodiment of the present disclosure has an object capable of inducing a driver into a safe state by monitoring a situation in which an unwanted and excessive output of the motor is generated regardless of a torque output requested by the VCU when the MCU controller has an internal failure or an abnormal control state in real time.

Hereinafter, a method of operating safely and controlling an electric motor according to an embodiment of the present disclosure is described with reference to FIGS. 1A to 4.

Figure 1B:
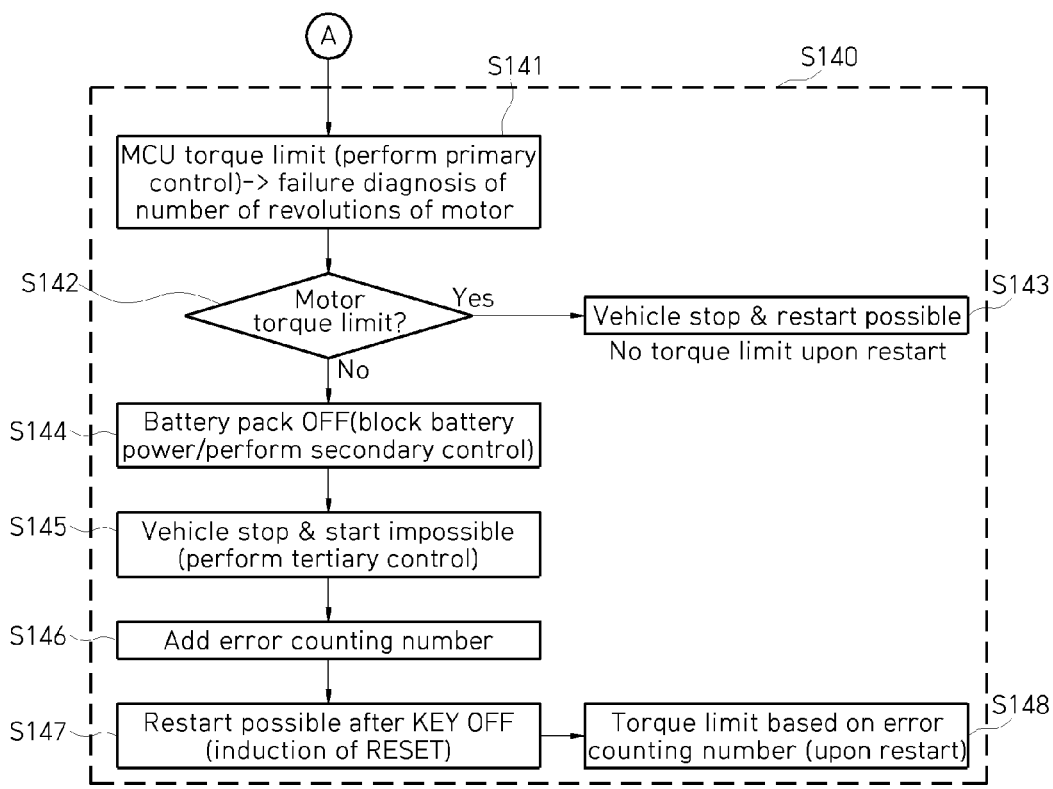
Figure 2A:
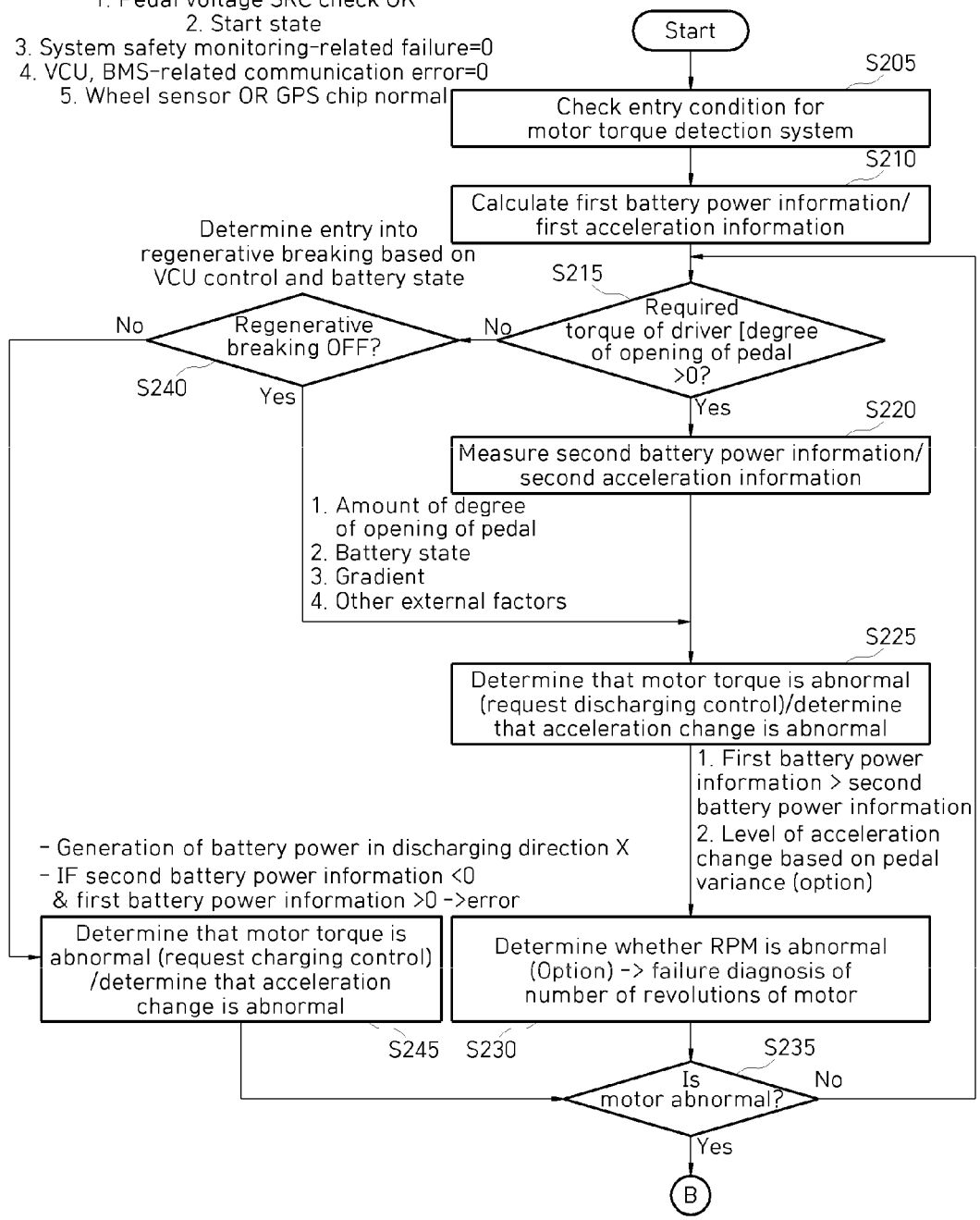
FIGS. 2A and 2B are flowcharts of a method of safely operating and controlling an electric motor according to a second embodiment of the present disclosure.
Figure 2B:
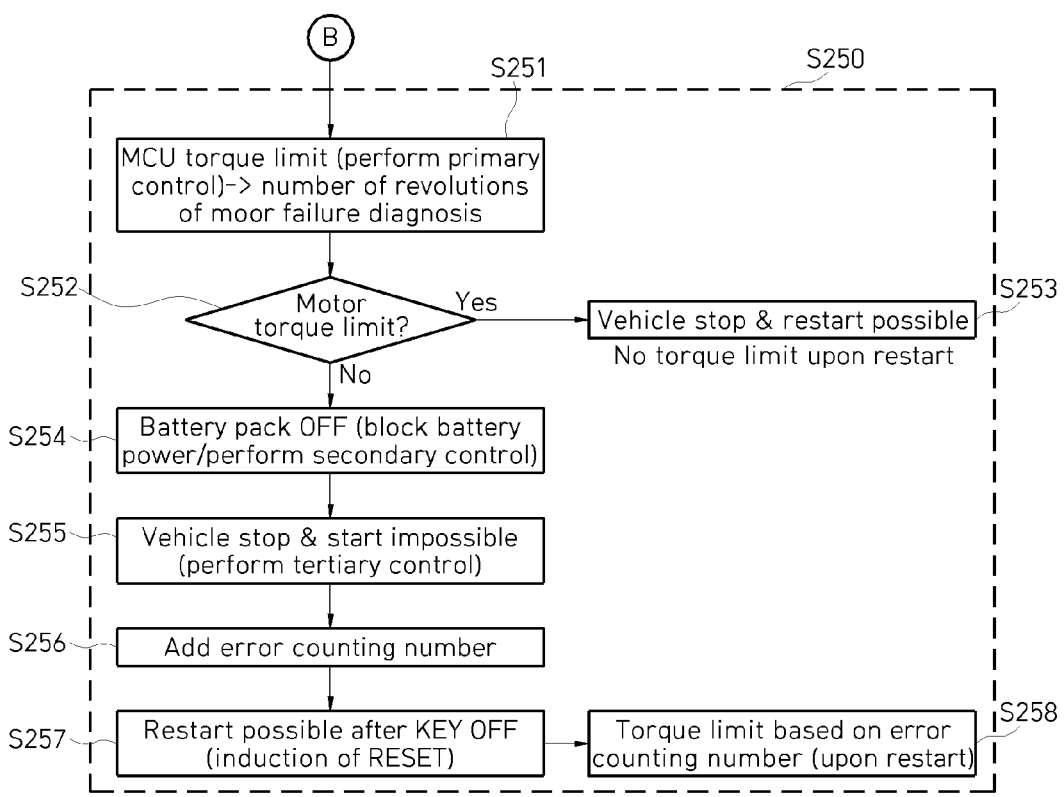
Figure 3A:
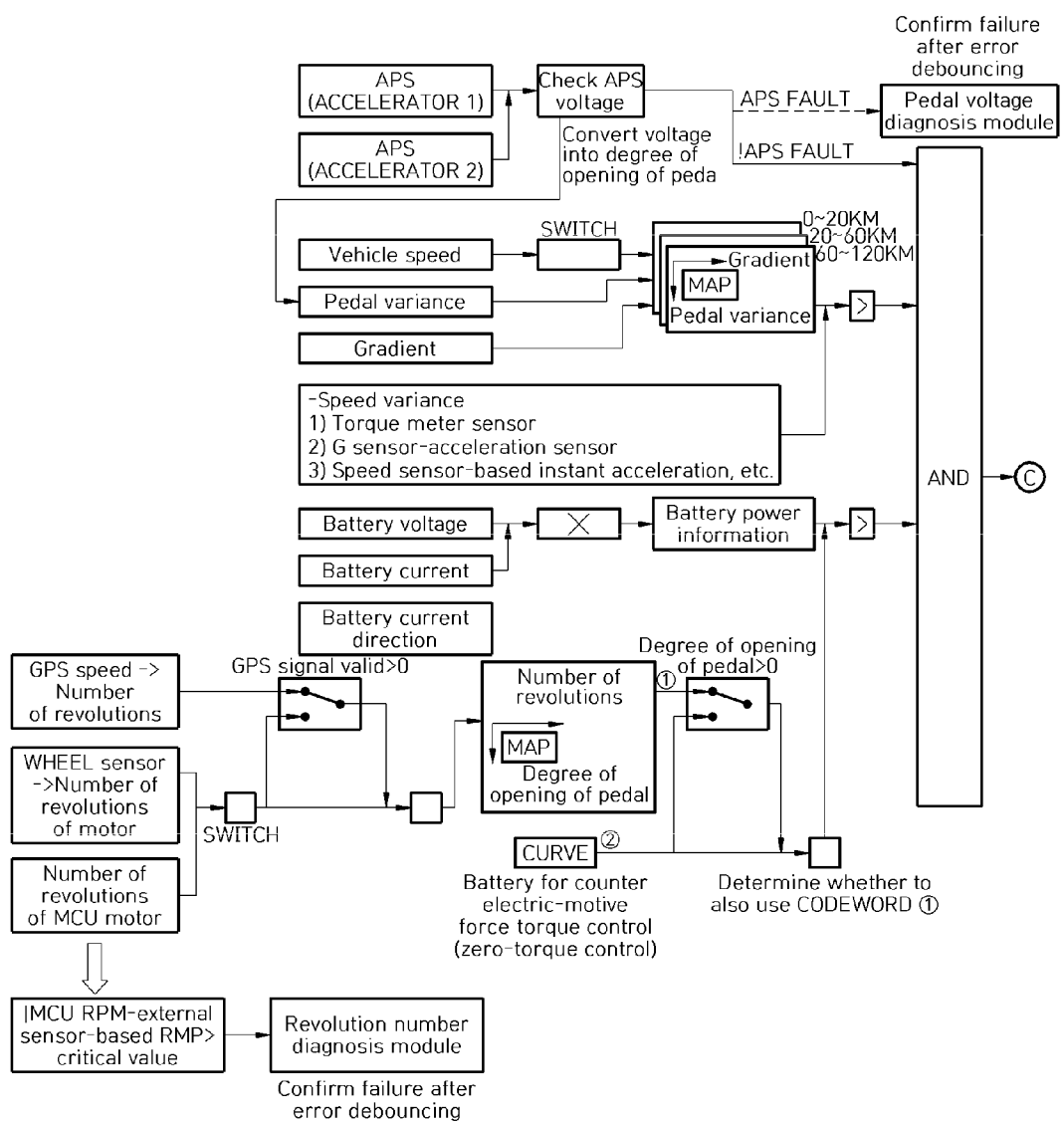
FIGS. 3A and 3B are diagrams for describing detailed structures of a system for safely operating and controlling an electric motor according to the first and second embodiments of the present disclosure.
Figure 3B:
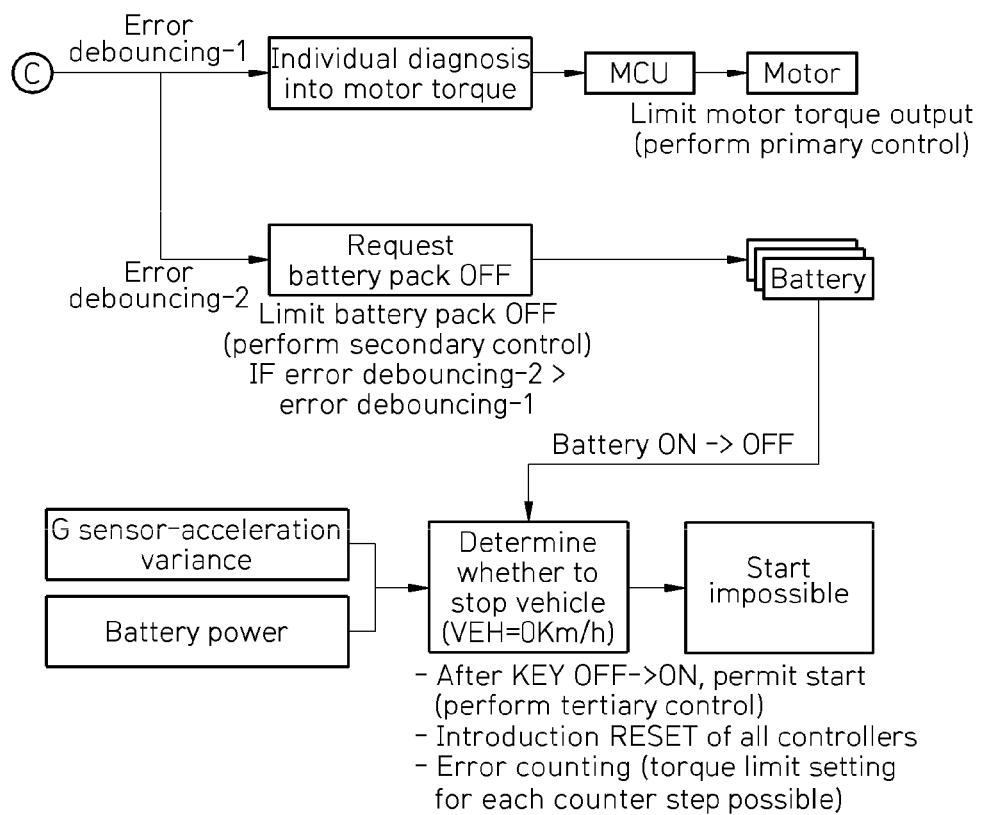

FIGS. 1A and 1B are flowcharts of a method of safely operating and controlling an electric motor according to a first embodiment of the present disclosure. FIGS. 2A and 2B are flowcharts of a method of safely operating and controlling an electric motor according to a second embodiment of the present disclosure. FIGS. 3A and 3B are diagrams for describing detailed structures of a system for safely operating and controlling an electric motor according to the first and second embodiments of the present disclosure.

Meanwhile, each of steps illustrated in FIGS. 1A to 2B may be understood as being performed by a system 100 for safely operating and controlling an electric motor, and more preferably understood as being performed by the VCU, but the present disclosure is not essentially limited thereto. Such an embodiment of the present disclosure may be basically applied to all mobility products each including a battery, a motor, an inverter, and controllers.

Meanwhile, an embodiment of the present disclosure may be implemented in the form of an integrated controller in which the VCU and the MCU have been integrated in addition to a case in which the VCU and the MCU are separately provided. In this case, functions of the VCU and the MCU may be independently implemented in a multi-core.

The present disclosure may induce a driver into a safe state by detecting the abnormality of motor torque in a failure situation of an electric mobility system. In this case, embodiments of the failure situation may include 1) a case in which the MCU is in an abnormal state, but an output value thereof is transmitted normally, 2) a case in which the VCU requests required torque (required torque set in a degree of opening of a throttle pedal) into which a driver's intention has been incorporated normally, but the MCU outputs excessive torque (the MCU cannot partially control the motor) compared to the required torque, and 3) a case in which the VCU and the MCU are normal, but motor torque is excessively output and a case in which motor torque excessively draws and uses battery power without the intervention of the MCU.

In order to detect such a failure situation, in an embodiment of the present disclosure, the VCU may determine the number of revolutions of the motor or whether torque is abnormal based on sensor information that is input to the VCU or information that is provided by the BMS, instead of information that is provided by the MCU.

As a method for detecting whether the motor is abnormal, in the present disclosure, whether the motor is abnormal is detected based on battery power information. That is, the battery power information for control of motor torque based on the number of revolutions of the motor is previously measured and secured and is then used as a determination criterion. In general, the motor has a torque output characteristic for each number of revolutions. Battery power that is used in this case also has a predetermined feature value for each driving situation.

In particular, in a 0 torque control situation in which required torque is not present, the motor generates only a force for control of a counter electromotive force for each number of revolutions. Battery power that is used at this time may have a fixed value because the battery power is a characteristic for each motor.

The VCU obtains such reference battery power information, calculates battery power information in real time on the basis of a battery current and voltage that are transmitted by the BMS while a vehicle travels, monitors whether the motor is abnormal by finally determining whether motor torque is excessively output contrary to a driver's intention based on a result of a comparison between the battery power information and a reference value, and may induce a driver into a safe state through a fault reaction.

Furthermore, in an embodiment of the present disclosure, as a method for detecting whether the motor is abnormal, acceleration information may be additionally used in addition to battery power information. Whether the motor is abnormal may be detected by using a dualization design for a sensor (a pedal sensor and a degree of opening thereof) into which a driver's intention has been incorporated and whether the sensor operates normally, the state of a degree of opening of the pedal, the amount of acceleration or an acceleration variance that is extracted from a torque meter sensor or a G sensor, a speed variance, such as instant acceleration based on a speed sensor, or information that is obtained by converting a GPS speed and comparing the GPS speed with motor torque when GPS information is valid, for example. Detecting whether the motor is abnormal by using such information is described in detail in a second embodiment of the present disclosure.

Meanwhile, the first embodiment of the present disclosure is the case of an electric mobility that is provided at a low price. If a variance in the external speed cannot be detected, whether the motor is abnormal may be detected by using only battery power information for each driving situation.

Referring to FIGS. 1A and 1B, in the method of safely operating and controlling an electric motor according to the first embodiment of the present disclosure, first, an entry condition for detecting motor torque of an electric mobility is checked (S105).

In an embodiment, the entry condition includes a condition in which a pedal voltage series resonant converter (SRC) state is normal, a condition in which the start of a vehicle is in a start state, a condition in which a system safety monitoring-related failure state is not present, and a condition in which a communication error related to the VCU or BMS is not present. Each of the conditions needs to be satisfied.

Next, first battery power information that is provided by the BMS is calculated while the vehicle travels (S110). In this case, the first battery power information may be calculated based on a current and voltage that are provided by the BMS in real time.

The present disclosure proposes a method of setting data based on characteristics of a motor in a situation in which the state of a degree of opening of the pedal is ON and OFF while a vehicle travels.

In an embodiment, when the state of the degree of opening of the pedal is the OFF state (S115-Y) and the electric mobility is not in a regenerative breaking state (S120-Y), second battery power information based on motor torque for each degree of opening of the pedal by a driver for each driving situation is measured (S125).

In the pedal OFF situation, at the moment when the pedal is taken off, battery power for the motor drops to a battery power level for 0 torque control. At this time, the time that is taken for the battery power to drop to battery power for 0 torque control for each number of revolutions of the motor is measured. Furthermore, a situation in which motor torque is discharged may be detected by checking whether the battery power returns to the battery power for 0 torque control within an arbitrarily set time in real time through the measurement of the moment when the pedal is taken off while driving by using the measured time.

When the electric mobility enters the regenerative breaking, if the battery generates a force in the direction in which the battery is discharged, it may be determined that motor torque oscillates. That is, in an embodiment of the present disclosure, in a situation in which the VCU requests oscillating or regenerative breaking from the motor via the MCU, motor torque may be monitored by using a real-time battery direction and power for each battery discharging or charging situation.

Next, the pieces of first and second battery power information are compared (S130). Whether the motor is abnormal is determined based on a result of the comparison (S135).

In an embodiment, when the first battery power information is greater than the second battery power information by a preset critical range, the motor may be determined to be abnormal. That is, when the first battery power information that is transferred in real time is greater than the second battery power information that is used as a reference value, the motor may be determined to be abnormal.

Next, when the motor is determined to be abnormal (S135), control for limiting the output of the motor step by step is performed (S140).

In the present disclosure, when the motor is determined to be abnormal, motor output limit control for introducing an electric mobility into a safe state is performed. In an embodiment of the present disclosure, control for limiting the output of the motor step by step is performed because damage to the motor or an element within the MCU controller may be caused if battery power is blocked from the beginning when a failure is detected.

First, when the abnormality of the motor is detected, primary control that limits the output of motor torque is performed through the MCU (S141). According to the primary control, if a motor control function portion of the MCU is normal, the output of the motor may be limited before the battery is blocked. If the output of the motor can be limited (S142-Y), the restart of the vehicle is permitted when the vehicle is stopped subsequently, and the limit of torque of the motor is released upon restart of the vehicle (S143).

Even after the primary control is performed, when it is detected that the motor has a value greater than a preset critical value, secondary control that blocks battery pack power is performed (S144). That is, even after the primary control is performed, when the motor torque is excessively output, it is determined that the MCU no longer plays its role. Accordingly, the battery pack power is blocked through a VCU-internal control sequence or a direct instruction from the BMS controller.

After the secondary control is performed, tertiary control that limits the start of the vehicle upon stop of the vehicle is performed (S145). When the tertiary control is performed, an error counting number for the abnormal state of the motor is added (S146). After the stop of the vehicle, a user is induced to operate the electric mobility after resetting the MCU through key ON/OFF (S147). Furthermore, as the resetting of the MCU is completed, the restart of the vehicle is permitted again (S148).

In this case, if the restart of the vehicle is permitted as the resetting of the MCU is completed, output torque of the motor is controlled to be determined based on the error counting number. That is, in an embodiment of the present disclosure, required torque for each degree of opening of the pedal by a driver may be limited to be reduced in accordance with the error counting number as the error counting number is increased. For example, stepwise limit control is performed, such as that only 70% of required torque is limited to be output upon next driving when limit control occurs once for the first time up to the tertiary control, only 50% of the required torque is limited to be output when limit control subsequently occurs twice, and the start of the vehicle is limited if limit control subsequently occurs three times. In this case, whether torque for each step will be normalized may be set based on a developer or customer's choice for safety.

In the second embodiment of the present disclosure, unlike in the first embodiment, whether motor torque is abnormal may be detected by measuring acceleration information based on a variance in the degree of opening of the pedal for each driving situation in addition to the first battery power information, using the acceleration information as a prediction value, and comparing the prediction value with an acceleration variance that is changed in real time in order to more accurately detect whether the motor torque is abnormal.

Referring to FIGS. 2A and 2B, in the method of safely operating and controlling an electric motor according to the second embodiment of the present disclosure, first, an entry condition for detecting motor torque of an electric mobility is checked (S205).

In an embodiment, as in the first embodiment, the entry condition includes a condition in which a pedal voltage series resonant converter (SRC) state is normal, a condition in which the start of a vehicle is in a start state, a condition in which a system safety monitoring-related failure state is not present, and a condition in which a communication error related to the VCU or BMS is not present. Each of the conditions needs to be satisfied. Additionally, the state of the wheel sensor or the GPS sensor needs to satisfy a normal condition.

Next, first battery power information that is provided by the BMS while the vehicle travels is calculated (S210). In this case, the first battery power information is calculated based on a current and voltage that are provided by the BMS in real time.

Furthermore, in step S210, acceleration information that is measured while driving is calculated. That is, first acceleration information that is measured while the vehicle travels based on at least one of the torque meter, the speed sensor, and the acceleration sensor is calculated. In this case, the first acceleration information may be an acceleration variance for a predetermined time.

Next, the state of a degree of opening of the pedal by a driver is checked. When the state of the degree of opening of the pedal is an ON state (S215-Y), second battery power information based on motor torque for each degree of opening of the pedal by the driver for each driving situation is measured (S220).

In this case, the second battery power information for each driving situation indicates information corresponding to at least one of the amount of remaining battery power charged, a degeneration degree, maximum output information, a battery cell temperature, a motor temperature, and a road surface gradient.

Furthermore, in step S220, second acceleration information based on a variance in the degree of opening of the pedal by the driver for each driving situation is measured.

Next, the pieces of first and second battery power information are compared (S225). Whether the motor is abnormal is determined based on a result of the comparison (S235). Furthermore, in step S225, whether the motor is abnormal may be determined by comparing the pieces of first and second acceleration information (S230).

In an embodiment, when the first battery power information is greater than the second battery power information by a preset critical range, the motor may be determined to be abnormal. That is, when the first battery power information that is transferred in real time is greater than the second battery power information that is used as a reference value, the motor may be determined to be abnormal.

Furthermore, whether the motor is abnormal may be checked based on whether RPM is abnormal by checking the level of an acceleration change based on a pedal variance through a comparison with the acceleration information.

Meanwhile, in step S215, when the state of the degree of opening of the pedal by the driver is OFF (S215-N) and the state of the electric mobility being not in the regenerative breaking state is satisfied (S240-Y), whether the electric mobility is controlled in a discharging direction is checked (S225). In this case, when the first battery power information that is transferred in real time is greater than the second battery power information that is used as the reference value because abnormality is present in the degree of the battery discharging, the motor may be determined to be abnormal.

Furthermore, in step S215, when the state of the degree of opening of the pedal by the driver is OFF (S215-N) and the state of the electric mobility being in the regenerative breaking state is satisfied (S240-N), battery power should not be generated in the discharging direction. Accordingly, when the second battery power information is less than 0 and the first battery power information is greater than 0, the motor may be determined to be abnormal (S245).

Next, when the motor is determined to be abnormal (S235), control for limiting the output of the motor step by step is performed (S250).

First, when the abnormality of the motor is detected, primary control that limits the output of motor torque is performed through the MCU (S251). According to the primary control, if a motor control function portion of the MCU is normal, the output of the motor may be limited before the battery is blocked. If the output of the motor can be limited (S252-Y), the restart of the vehicle is permitted when the vehicle is stopped subsequently, and the limit of torque of the motor is released upon restart of the vehicle (S253).

Even after the primary control is performed, when it is detected that the motor has a value greater than a preset critical value, secondary control that blocks battery pack power is performed (S254). That is, even after the primary control is performed, when the motor torque is excessively output, it is determined that the MCU no longer plays its role. Accordingly, the battery pack power is blocked through a VCU-internal control sequence or a direct instruction from the BMS controller.

After the secondary control is performed, tertiary control that limits the start of the vehicle upon stop of the vehicle is performed (S255). When the tertiary control is performed, an error counting number for the abnormal state of the motor is added (S256). After the stop of the vehicle, a user is induced to operate the electric mobility after resetting the MCU through key ON/OFF (S257). Furthermore, as the resetting of the MCU is completed, the restart of the vehicle is permitted again (S258).

In this case, if the restart of the vehicle is permitted as the resetting of the MCU is completed, output torque of the motor is controlled to be determined based on the error counting number. That is, in an embodiment of the present disclosure, required torque for each degree of opening of the pedal by a driver may be limited to be reduced in accordance with the error counting number as the error counting number is increased. For example, stepwise limit control is performed, such as that only 70% of required torque is limited to be output upon next driving when limit control occurs once for the first time up to the tertiary control, only 50% of the required torque is limited to be output when limit control subsequently occurs twice, and the start of the vehicle is limited if limit control subsequently occurs three times. In this case, whether torque for each step will be normalized may be set based on a developer or customer's choice for safety.

Figure 4:
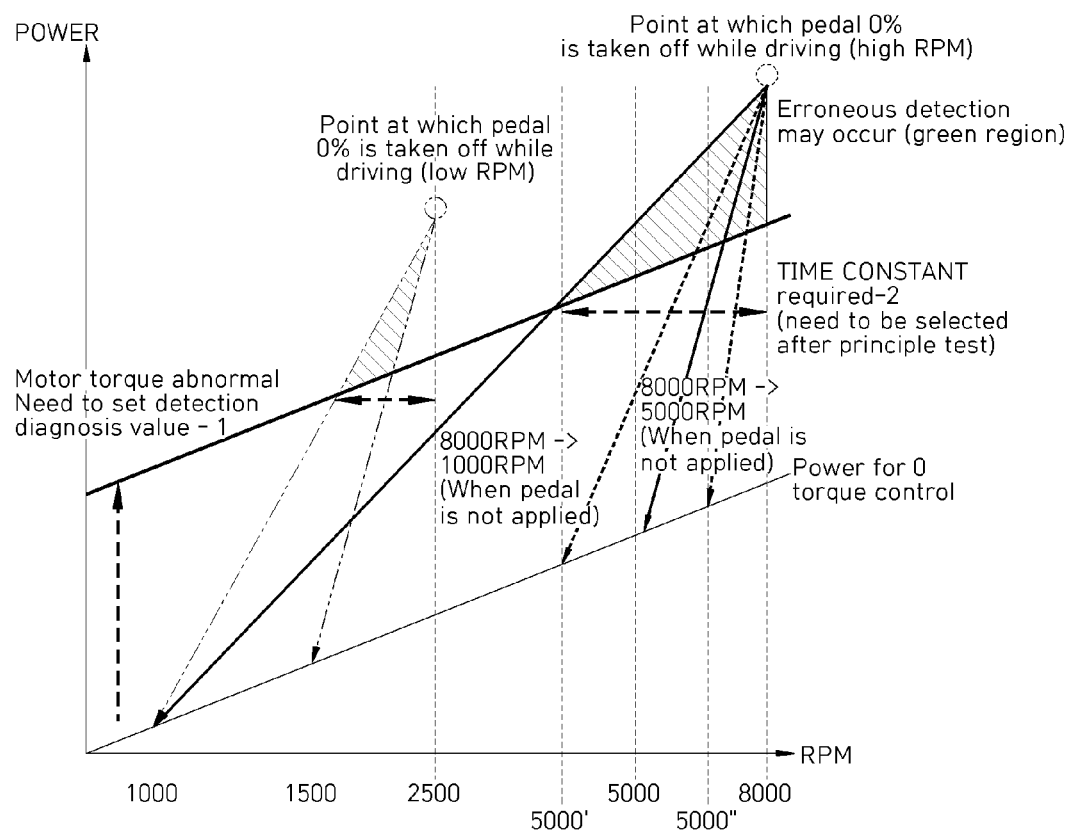
FIG. 4 is a diagram illustrating the relation between battery power information and an RPM in the first and second embodiments of the present disclosure.

FIG. 4 is a diagram illustrating the relation between battery power information and an RPM in the first and second embodiments of the present disclosure.

Meanwhile, in the aforementioned description, each of S110 to S170 may be further divided into additional steps or the steps may be combined into smaller steps depending on an implementation example of the present disclosure.

Furthermore, some of the steps may be omitted, if necessary, and the sequence of the steps may be changed. Furthermore, although contents are omitted, the contents described with reference to FIGS. 1A to 4 may also be applied to the contents described with reference to FIG. 5.

Figure 5:
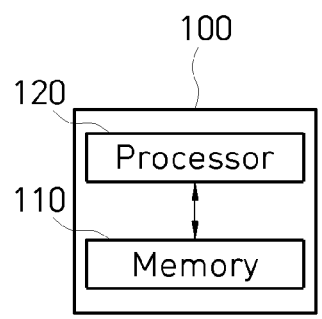
FIG. 5 is a block diagram of a system for safely operating and controlling an electric motor according to an embodiment of the present disclosure.

FIG. 5 is a block diagram of a system 100 for safely operating and controlling an electric motor according to an embodiment of the present disclosure.

The system 100 for safely operating and controlling an electric motor according to an embodiment of the present disclosure includes memory 110 and a processor 120.

The memory 110 stores a program for determining whether an electric motor is abnormal based on battery power information and limiting the output of the motor corresponding to the determination.

The processor 120 calculates first battery power information that is provided by the BMS while a vehicle travels by executing the program stored in the memory 110, and measures second battery power information based on motor torque for each degree of opening of the pedal by a driver for each driving situation. Furthermore, the processor 120 determine whether the motor is abnormal by comparing the pieces of first and second battery power information, and performs control for limiting the output of the motor step by step when determining that the motor torque is abnormal.

The method of safely operating and controlling an electric motor according to embodiments of the present disclosure may be implemented in the form of a program (or application) in order to be executed in combination with a computer, that is, hardware, and may be stored in a medium.

The aforementioned program may include a code coded in a computer language, such as C, C++, JAVA, Ruby, or a machine language which is readable by a processor (CPU) of a computer through a device interface of the computer in order for the computer to read the program and execute the methods implemented as the program. Such a code may include a functional code related to a function, etc. that defines functions necessary to execute the methods, and may include an execution procedure-related control code necessary for the processor of the computer to execute the functions according to a given procedure. Furthermore, such a code may further include a memory reference-related code indicating at which location (address number) of the memory inside or outside the computer additional information or media necessary for the processor of the computer to execute the functions needs to be referred to. Furthermore, if the processor of the computer requires communication with any other remote computer or server in order to execute the functions, the code may further include a communication-related code indicating how the processor communicates with the any other remote computer or server by using a communication module of the computer and which information or media needs to be transmitted and received upon communication.

The medium in which the method is stored means a medium that semi-permanently stores data and that is readable by a device, not a medium that stores data for a short moment like a register, a cache, or memory. Specifically, examples of the medium in which the method is stored include ROM, RAM, CD-ROM, a magnetic tape, a floppy disk, optical data storage, etc., but the present disclosure is not limited thereto. That is, the program may be stored in various recording media in various servers which may be accessed by a computer or various recording media in a computer of a user. Furthermore, the medium may be distributed to computer systems connected over a network, and a code readable by a computer in a distributed way may be stored in the medium.

The description of the present disclosure is illustrative, and a person having ordinary knowledge in the art to which the present disclosure pertains will understand that the present disclosure may be easily modified in other detailed forms without changing the technical spirit or essential characteristic of the present disclosure. Accordingly, it should be construed that the aforementioned embodiments are only illustrative in all aspects, and are not limitative. For example, components described in the singular form may be carried out in a distributed form. Likewise, components described in a distributed form may also be carried out in a combined form.

The scope of the present disclosure is defined by the appended claims rather than by the detailed description, and all changes or modifications derived from the meanings and scope of the claims and equivalents thereto should be interpreted as being included in the scope of the present disclosure.

The invention claimed is:

1. A method of safely operating and controlling an electric motor in an electric mobility, the method comprising:
    calculating first battery power information that is provided by a battery management system (BMS) while a vehicle travels;
    measuring second battery power information based on motor torque for each degree of opening of a pedal by a driver for each driving situation;
    comparing the pieces of first and second battery power information;
    determining whether the motor is abnormal based on a result of the comparison; and
    performing control for limiting an output of the motor step by step when the motor is determined to be abnormal.

2. The method of claim 1, wherein the calculating of the first battery power information that is provided by the BMS while the vehicle travels comprises calculating the first battery power information based on current and voltage information that is provided by the BMS.

3. The method of claim 1, wherein:
    the measuring of the second battery power information based on the motor torque for each degree of opening of the pedal by the driver for each driving situation comprises calculating the second battery power information for 0 torque control when a state of the degree of opening of the pedal by the driver is an OFF state in a non-regenerative breaking state, and
    the determining of whether the motor is abnormal based on the result of the comparison comprises determining that the motor is abnormal when the first battery power information is greater than the second battery power information by a preset critical range.

4. The method of claim 1, wherein:
    the measuring of the second battery power information based on the motor torque for each degree of opening of the pedal by the driver for each driving situation comprises calculating the second battery power information in a regenerative breaking state when a state of the degree of opening of the pedal by the driver is an OFF state, and
    the determining of whether the motor is abnormal based on the result of the comparison comprises determining that the motor is abnormal when the second battery power information is less than 0 and the first battery power information is greater than 0.

5. The method of claim 1, wherein the measuring of the second battery power information based on the motor torque for each degree of opening of the pedal by the driver for each driving situation comprises measuring the second battery power information for each driving situation corresponding to at least one of an amount of remaining battery power charged, a degeneration degree, maximum output information, a battery cell temperature, a motor temperature, and a road surface gradient.

6. The method of claim 1, further comprising:
    calculating first acceleration information that is measured while the vehicle travels based on at least one of a torque meter, a speed sensor, and an acceleration sensor;
    measuring second acceleration information based on a variance in the degree of opening of the pedal by the driver for each driving situation and comparing the second acceleration information with the first acceleration information; and
    determining whether the motor is abnormal based on a result of the comparison.

7. The method of claim 1, wherein the performing of the control for limiting the output of the motor step by step when the motor is determined to be abnormal comprises performing primary control that limits an output of the motor torque through an MCU.

8. The method of claim 7, wherein the performing of the control for limiting the output of the motor step by step when the motor is determined to be abnormal comprises performing secondary control that blocks battery pack power when the motor torque is greater than a preset critical value after performing the primary control.

9. The method of claim 8, wherein the performing of the control for limiting the output of the motor step by step when the motor is determined to be abnormal comprises performing tertiary control that limits a start of the vehicle upon stop of the vehicle after performing the secondary control.

10. The method of claim 9, wherein the performing of the tertiary control comprises:
    adding an error counting number for an abnormal state of the motor;
    resetting the MCU after the stop of the vehicle; and
    permitting a restart of the vehicle as the resetting of the MCU is completed.

11. The method of claim 10, wherein the permitting of the restart of the vehicle as the resetting of the MCU is completed comprises limiting required torque for each degree of opening of the pedal by the driver so that the required torque is reduced in accordance with the error counting number as the error counting number is increased.

12. A system for safely operating and controlling an electric motor in an electric mobility, the system comprising:
    memory in which a program for determining whether an electric motor is abnormal based on battery power information and limiting an output of the motor corresponding to the determination has been stored, and a processor configured to execute the program stored in the memory, wherein the processor calculates first battery power information that is provided by a battery management system (BMS) while a vehicle travels by executing the program, measures second battery power information based on motor torque for each degree of opening of a pedal by a driver for each driving situation, determines whether the motor is abnormal by comparing the pieces of first and second battery power information, and performs control for limiting an output of the motor step by step when the motor torque is determined to be abnormal.

* * * * *